United States Patent
Wu et al.

(10) Patent No.: US 9,309,382 B2
(45) Date of Patent: Apr. 12, 2016

(54) GRAPHENE POLYMER COMPOSITE MATERIAL

(71) Applicant: Enerage Inc., Yilan County (TW)

(72) Inventors: Mark Y Wu, Yilan County (TW); Cheng-Yu Hsieh, Yilan County (TW); Jing-Ru Chen, Yilan County (TW); Shu-Ling Hsieh, Yilan County (TW)

(73) Assignee: Enerage Inc., Wujie Township, Yilan County (TW)

( * ) Notice: Subject to any disclaimer, the term of this patent is extended or adjusted under 35 U.S.C. 154(b) by 0 days.

(21) Appl. No.: 14/527,599

(22) Filed: Oct. 29, 2014

(65) Prior Publication Data

US 2015/0368439 A1 Dec. 24, 2015

(30) Foreign Application Priority Data

Jun. 24, 2014 (TW) .............................. 103121767 A

(51) Int. Cl.
 *C08K 9/06* (2006.01)
 *C08K 3/04* (2006.01)
(52) U.S. Cl.
 CPC .... *C08K 9/06* (2013.01); *C08K 3/04* (2013.01)
(58) Field of Classification Search
 CPC .............. D01D 5/08; H01B 1/12; D01F 1/09; C08K 9/06; C08K 3/04
 USPC ........................................................ 524/210
 See application file for complete search history.

(56) References Cited

U.S. PATENT DOCUMENTS

2012/0301707 A1 11/2012 Kinloch et al.
2013/0150516 A1* 6/2013 Lettow ..................... C08K 3/04
 524/495

FOREIGN PATENT DOCUMENTS

| CN | 102850543 A | 1/2013 | |
| CN | 103194059 A | 7/2013 | |
| CN | 102321379 B | 8/2013 | |
| WO | WO 2009147415 A1 * | 12/2009 | ......... C08G 59/5033 |

* cited by examiner

*Primary Examiner* — Angela C Scott
(74) *Attorney, Agent, or Firm* — Muncy, Geissler, Olds & Lowe, P.C.

(57) ABSTRACT

Disclosed is a graphene polymer composite material, including a matrix resin, a filler and a plurality of nano-scaled graphene sheets. Each nano-scaled graphene sheet has a surface-modified layer formed of a surface modifying agent, which provides hydrophilic and hydrophobic functional groups used to form chemical bonds with the matrix resin and the filler, thereby greatly improving strength of junction cohesion. The filler helps the graphene sheets to contact each other so as so to increase overall electrical conductivity and thermal conductivity. Since the graphene sheets are uniformly dispersed in the matrix resin, the composite material of the present invention possesses excellent mechanical property, anti-oxidation, acid-base resistance, high electrical conductivity and thermal conductivity. Therefore, the composite material is suitable for the industries in need of high performance material.

10 Claims, 1 Drawing Sheet

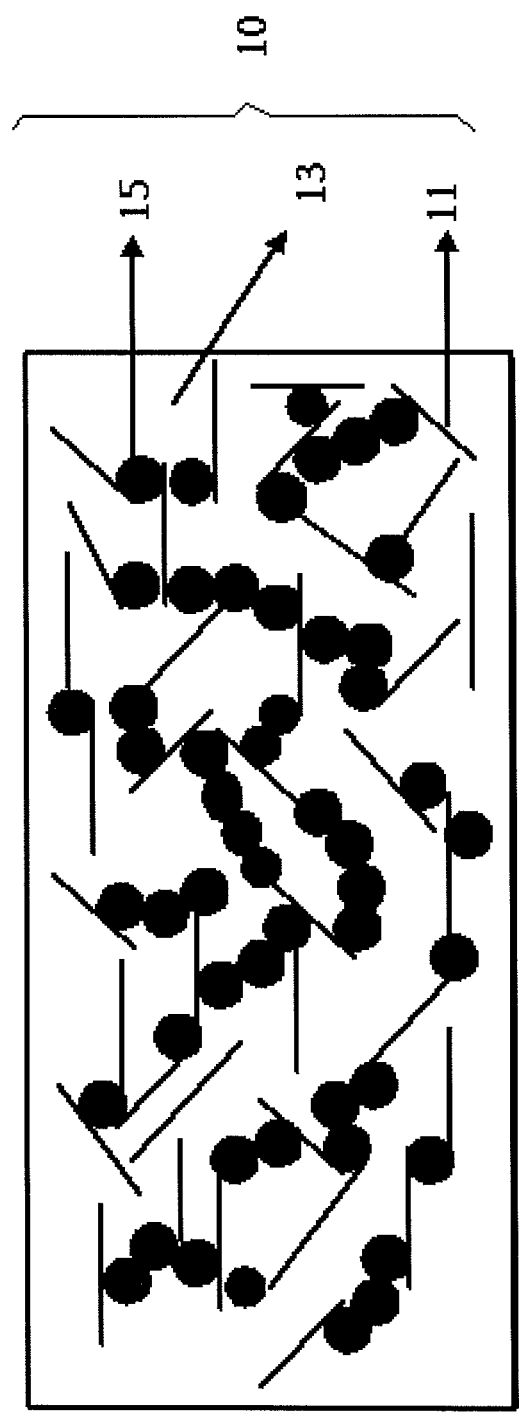

GRAPHENE POLYMER COMPOSITE MATERIAL

CROSS-REFERENCES TO RELATED APPLICATION

This application claims the priority of Taiwanese patent application No. 103121767, filed on Jun. 24, 2014, which is incorporated herewith by reference.

BACKGROUND OF THE INVENTION

1. Field of the Invention

The present invention generally relates to a graphene polymer composite material, and more specifically to a graphene polymer composite material having nano-scaled graphene sheets with modified surface to improve compatibility with the filler and the matrix resin, thereby achieving the effect of uniform mixing, increasing cohesion strength and forming a high performance composite material.

2. The Prior Arts

It is well known that graphene is constructed by two-dimensional crystal bonded with $sp^2$ hybrid orbital in a form of hexagonal honeycomb, and has a thickness of only 0.335 nm (one diameter of carbon atom) such that graphene is the thinnest material in the world. In particular, graphene also exhibits both excellent thermal conductivity and electrical conductivity, and its mechanical strength is higher than steel by one hundred times more with its specific gravity only one fourth of steel. Therefore, graphene is one of the best options for improving the current composite materials.

However, one of the problems related to the application field of graphene is that graphene is easy to congregate or stack to form a larger bulk. Thus, it has been one of the primary bottlenecks for the present industries to prevent graphene sheets from stacking on each other so as to obtain graphene powder with high uniformity and having few layers stacked.

For years, polymer has become a widely used material. As the semiconductor and electronic technologies made fast progresses, the material as desired is more critical. In general, the quality of the material required by the high end industries like mechanical property, chemical stability, weather endurance, thermal conductivity and electrical conductivity can not be well fulfilled by one kind of traditional polymer material. For instance, Nylon is a common engineering material and has excellent properties such as mechanical strength, abrasion resistance and thermal resistance, but is still poor in some performance like higher absorption of humidity and lower acid/base resistance. In particular, it is easy for Nylon to oxidize and deteriorate, or even break molecular chains. Therefore, its actual application is quite limited.

In the prior arts, one means to overcome the above drawbacks is to combine the traditional polymer with the nano-scaled material so as to form a nano-scaled composite material, which is lighter, more workability and has improved mechanical property like high impact resistance. The nano-scaled composite material has been widely employed in various industries such as automobile, airplane, information, medicine, and so on, or even a new industry for the composite material is created to develop the application in the future.

CN103194059A in the prior arts disclosed a low cost composite material comprising electrically conductive Nylon 6, graphene and carbon black. Specifically, electrically conductive Nylon 6 is blended with graphene and carbon black in a high speed mixer. The mixture is placed in the double screw extruder and further extruded to form composite particles, or the double screw extruder with fed-in segments is employed to manufacture the composite material with Nylon 6. Although the resultant material has higher electrical conductivity than the original material, only Nylon 6 with low viscosity is allowed for this specific process because junction cohesion between other high viscous material and graphene is poor and graphene is not uniformly dispersed in the matrix polymer.

Another patent CN102321379 B disclosed a method for manufacturing a composite material having electrically conductive graphene by means of liquid or mechanical mixing. Additionally, CN102850543A disclosed the graphene microspheres obtained by spraying and drying are mixed and wetted in an acidic solution containing some oxidant so as to provoke polymerization. After the subsequent reduction process, the graphene/electrical polymer composite material is manufactured. This method can obtain uniformly dispersed composite material, but the monomer of the polymer has to be added to graphene during polymerization. Thus, the process lacks flexibility and is not practical in the actual application, adversely affecting industrial utilization.

US 20120301707A1 disclosed a graphene polymer composite, which is manufactured by using an adhesive to adhere a substrate and graphene or functionalized graphene in a liquid carrier, and covering graphene or functionalized graphene with a protective layer. Another means is that graphene or functionalized graphene is dispersed in the liquid carrier and the slurry mixture is then coated on the polymeric substrate to form a film of composite material. However, the target object is covered with a graphene layer to change only its surface property instead of the bulk properties of various mixed materials.

Therefore, it is greatly needed for the graphene polymer composite material manufactured by employing the specific functional groups on the surface of graphene to improve compatibility with the filler and the plastic material so as to form a high performance composite with excellent uniformity and strong cohesion. Thus, mechanical strength is effectively enhanced and thermally/electrically conductivity is greatly increased, thereby overcoming the above problems in the prior arts.

SUMMARY OF THE INVENTION

The primary object of the present invention is to provide a graphene polymer composite material comprising a matrix resin, a filler and nano-scaled graphene sheets. Specifically, the nano-scaled graphene sheet has a surface-modified layer formed of a surface modifying agent, which provides hydrophilic and hydrophobic functional groups used to form chemical bonds with the matrix resin and the filler, thereby greatly improving strength of junction cohesion. Additionally, the nano-scaled graphene sheets with the surface-modified layer improve compatibility with carbon black and the matrix resin such that the nano-scaled graphene sheets are easily and uniformly dispersed in the matrix resin and in contact with each other through electrically conductive carbon black. Thus, the high performance composite material is obtained.

Preferably, a ratio of the particle size of the filler to the thickness of the nano-scaled graphene sheet is about 2-1000.

More specifically, the matrix resin may comprise thermoplastic resin and/or thermoset resin such as at least one of polyolefin, polyester, polycarbonate, polyurethane, polyacrylonitrile-butadiene-styrene, epoxy resin, melamine resin, Mylar resin, urea resin and phenolic resin. The filler is thermally and electrically conductive. Additionally, the graphene polymer composite material further comprising a wetting dispersant, which makes the filler and the nano-scaled graphene sheets uniformly dispersed in the matrix resin without aggregation. The wetting dispersant comprises at least one of stearamide, polyamide wax, white mineral oil, polypropylene wax, polyethylene wax, vinyl acetate wax, paraffin wax, poly(1 6-hexamethylene adipate), calcium stearate, zinc stearate, poly(methyl methacrylate), polyacrylic acid, polyethylenimine, polyacrylamide ethyl-trimethyl-ammonium chloride, polyvinylpyrrolidone (PVP), steric acid and 3-(trimethoxysilyl)propyl methacrylate.

In particularly, the modified-surface layer is formed on the graphene sheet by a surface-modifying agent or a coupler through a physical or chemical force. More specifically, the surface-modifying agent or the coupler comprises a hydrophilic or hydrophobic functional group, which causes the graphene sheets to form chemical bonding with the filler and the matrix resin.

Since the modified-surface layer may help the graphene sheets being well dispersed in the matrix resin, the graphene polymer composite material of the present invention greatly strengthens junction cohesion and improves various properties like mechanical performance, anti-oxidation, acid and alkali-resistance, electrical conductivity and thermal conductivity.

BRIEF DESCRIPTION OF THE DRAWINGS

The present invention can be understood in more detail by reading the subsequent detailed description in conjunction with the examples and references made to the accompanying drawings, wherein:

FIGURE is a sectional view schematically showing the graphene polymer composite material according to the present invention.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Please refer to FIGURE showing the graphene polymer composite material according to the present invention. As shown in FIGURE, the graphene polymer composite material 10 of the present invention generally comprises a plurality of nano-scaled graphene sheets 11, a matrix resin 13 and a filler 15, which are preferably 0.01-20 wt % (weight percent), 40-99 wt % and 1-40 wt % of the graphene polymer composite material, respectively. The nano-scaled graphene sheets 11 are uniformly dispersed in the matrix resin 13 and in contact with each other through the filler 15 so as to construct an electrically conductive network structure.

The graphene polymer composite material 10 of the present invention can be mixed with other materials by means of solution blending or mechanical blending so as to obtain the homogeneous composite.

The matrix resin 13 serves as a composite base, and generally comprises at least one of thermoplastic resin, thermoset resin and elastomer. Specifically, the matrix resin 13 comprises at least one of polyolefine, polyester, polycarbonate, polyurethane, polyamide, poly(methyl methacrylate), polyacetal, fluorocarbon resin, polyphenylene oxide, polyacrylonitrile-styrene and polyacrylonitrile-butadiene-styrene, or combination thereof.

Alternatively, the matrix resin 13 comprises at least one of epoxy resin, melamine resin, Mylar resin, urea resin and phenolic resin, or combination thereof.

Furthermore, the matrix resin 13 comprises at least one of styrenic elastomer, olefinic elastomer, urethane elastomer, ester elastomer and amide elastomer.

Specifically, the filler 15 is electrically and thermally conductive, and the primary object of the filler 15 is to increase the allowable content of the additives in the composite material so as to improve the performance after the composite base material is formed. This is because the nano-scaled graphene sheets 11 is a nano-scaled material with a high specific area such that the nano-scaled graphene sheets 11 has a huge volume, and in contrast, its tap density is very low. Therefore, the allowable concentration of the additive is considerable limited during manufacturing the composite material. Fortunately, the filler 15 can solve this problem. Another object of the filler 15 is that the nano-scaled graphene sheet 11 has a two dimensional planar structure, the filler 15 is generally a three dimensional particle structure, and the nano-scaled graphene sheets 11 are easily in contact with each other through the filler 15 so as to form an effective network structure in the matrix resin 13, thereby achieving excellent predetermined performance at the lowest content of the additive.

Preferably, the filler 15 is selected from a group consisting of at least one of metal particle, ceramic particle and carbon black. The metal particle is selected from a group consisting of at least one of gold, silver, copper, nickel, titanium and aluminum. The ceramic particle is selected from a group consisting of at least one of aluminum nitride, boron nitride, silicon carbide, aluminum oxide, silicon oxide, aluminum hydroxide and magnesium hydroxide.

In particular, a ratio of the particle size of the filler 15 to the thickness of the nano-scaled graphene sheet 11 is preferably 2-1000 according to the above effect.

Specifically, the graphene polymer composite material 10 of the present invention may further comprises a wetting dispersant, by which causes the nano-scaled graphene sheets 11 and the filler 15 (like carbon black) to be uniformly dispersed in the matrix resin 13 without aggregation. The wetting dispersant comprises at least one of stearamide, polyamide wax, white mineral oil, polypropylene wax, polyethylene wax, vinyl acetate wax, paraffin wax, poly(1 6-hexamethylene adipate), calcium stearate, zinc stearate, poly(methyl methacrylate), polyacrylic acid, polyethylenimine, polyacrylamide ethyl-trimethyl-ammonium chloride, polyvinylpyrrolidone (PVP), steric acid and 3-(trimethoxysilyl)propyl methacrylate, or combination thereof.

The nano-scaled graphene sheet 11 of the present invention comprises N stacked graphene layers, where N is 30-300. The nano-scaled graphene sheet 11 has a tap density about 0.1-0.01 g/cm$^3$, and its thickness is 10-100 nm. Further, the lateral size is 1-100 μm, and a ratio of the lateral size to the thickness is 10-10000.

Moreover, the above graphene sheet 11 substantially has at least one surface-modified layer, which covers the surface of the graphene sheet 11 through a physical or chemical force and formed by at least one surface modifying agent or coupler. The surface modifying agent or the coupler comprises a hydrophilic or hydrophobic functional group, which can cause the graphene sheets 11 to form chemical bonding with the matrix resin 13 and the filler 15 so as to increase compatibility. Additionally, the coupler has a chemical formula specified by $M_x(R)_y(R')_z$, where M is a metal element, R is a hydrophilic functional group, and R' is a hydrophobic functional group, $0 \leq x \leq 6$, $1 \leq y \leq 20$, $1 \leq z \leq 20$.

The above hydrophilic functional group R is selected from a group consisting of at least one of alkoxy, carbonyl, carboxyl, acyloxy, acylamino, alkyleneoxy and alkyleneoxycarboxyl groups, the metal element M is selected from a group consisting of at least one of aluminum, titanium, zirconium and silicon, and the hydrophobic functional group R' is selected from a group consisting of at least one of ethyl, lipoepoxylalkyl, styryl, methylpropylacyloxy, acryloxy, lipoamino, chloropropyl, lipothiohydroxy, liposulfido, isocyanato, lipourea, lipocarboxyl, lipohydroxyl, cyclohexanyl, phenyl, lipoformyl, acetyl, benzoly, amino and carboxyl acid groups.

The surface modifying agent is specified by a chemical formula Rx-R'y, where R is selected form a group consisting of at least one of benzyl group, pyridine or triazine, and R' is selected form a group consisting of amino, alkoxy, carbonyl, carboxyl, acyloxy, acylamino, alkyleneoxy, dimethylamino and alkyleneoxy-carboxyl groups, $1 \leq x \leq 4$, and $0 \leq y \leq 10$.

Furthermore, it is preferred that the oxygen content of the nano-scaled graphene sheet 11 is 3-20 wt %.

To further illustrate the practical benefits provided by the graphene polymer composite material 10 according to the present invention, some following experimental examples are described to help those skilled in this technical field well understand the practical processes of the present invention in more details.

Experimental Example 1

The coupler 3-Aminopropyl triethoxysilane is selected as the surface-modifying agent and has a formula $Si(C_3H_6N)(C_2H_5O)_3$. Practically, the surface-modifying agent is added to a solution comprising alcohol and water. Then, the nano-scaled graphene sheets are added and mixed by means of ultrasonic vibration. The processes of vacuum extraction and filtration are performed to obtain the powder, and the powder is dried in the oven so as to generate the nano-scaled graphene sheets with modified surface. Overall speaking, the nano-scaled graphene sheets are manufactured by means of oxidation-reduction such that its surface has some specific functional group like carboxyl or alkyl, which reacts with siloxane to form the nano-scaled surface-modified graphene sheets.

Experimental Example 2

The recipe includes 60% of polycarbonate as the matrix resin, 20% of carbon black, 5% of the previous nano-scaled graphene sheets and 15% of polymethyl methacrylate, which are pre-mixed. The mixture is placed in the high speed mixer to perform the high speed mixing process, and then placed into a banbury mixer to perform a banbury treatment at 180° C. for 10 minutes so as to acquire a composite material. Next, the composite material is smashed, extruded through a double screw extruder, and hot cut and cooled down in water. Finally, the resultant material is dried to form the graphene masterbatch.

Experimental Example 3

The graphene masterbatch from Experimental example 2 is poured into an injection molding machine, in which the feeding temperature is set 270-290° C., the mold temperature is 100-120° C., the injection pressure is 40-80%, and the injection speed is 10-30%. The graphene composite material is thus manufactured by means of injection molding.

Experimental Example 4

This process is similar to Experimental examples 1-3, and the difference is that the matrix resin is replaced by Nylon 6. The recipe includes 80% of Nylon 6, 15% of carbon black and 5% of the previous nano-scaled graphene sheets, which are processed to form the graphene masterbatch. Next, the graphene masterbatch is poured into the injection molding machine, in which the feeding temperature is set 130-260° C., the mold temperature is 60-100° C., the injection pressure is 30-70%, and the injection speed is 30-60%. The graphene composite material is obtained by injection molding. Specifically, the graphene composite material has a volume resistivity of $9*10^2$ ohm*cm.

Experimental Example 5

First, the graphene sheets and phthalic acid are well mixed and placed in the oven, which is vacuum evacuated and the pressure is less than $10^{-2}$ torr. The oven is heated up to a surface cleaning temperature like 200° C. for 3 hours to clean the graphene sheets, and then heated up to a surface absorption temperature like 400° C. for 1 hour to sublimate the surface modifying agent and further diffuse the sublimated vapor into the clean surface of the graphene sheets. The graphene sheets thus have the surface-modified layer.

Experimental Example 6

The recipe includes 88% of Nylon 6, 10% of carbon black and 2% of the previous nano-scaled graphene sheets, which are pre-mixed and further added with formic acid to prepare a 20 wt % solution by stirring. The solution is coated on a PET substrate, and dried at room temperature to evaporate the liquid so as to obtain a film of the graphene composite material with a thickness of 20-60 μm. Specifically, the graphene composite material has a volume resistivity of $4.3*10^2$ ohm*cm.

After the above graphene composite material contacts a heat source at 75° C. for 10 minutes to attain thermal equilibrium, an infrared thermometer is used to detect the surface temperature of the graphene sheets. The detected temperature is 69° C. less than the original heat source by 5° C. Therefore, the graphene composite material exhibits excellent thermal conductivity.

Experimental Example 7

This recipe includes 98% of polyurethane and 2% of the previous nano-scaled graphene sheets. First, the raw materials are pre-mixed according the recipe. Butanone is then added and strongly stirred. The mixture is coated on the PET substrate and evaporates at room temperature to form the graphene composite material, which has a thickness of 120-160 μm and a volume resistivity of $4.3*10^2$ ohm*cm. After the graphene composite material contacts a heat source at 75° C. for 10 minutes to attain thermal equilibrium, the surface temperature of the graphene sheets is detected by the infrared thermometer, and the result is 73° C. lower than the original heat source by 1.5° C.

Experimental Example 8

The present recipe includes 93% of polyurethane, 5% of carbon black and 2% of the previous nano-scaled graphene sheets. Similarly, the raw materials are pre-mixed according the recipe and Butanone is then added and strongly stirred. The PET substrate is coated by the mixture and the liquid evaporates at room temperature to form the graphene composite material, which has a thickness of 120-160 μm and a volume resistivity of $4.3*10^2$ ohm*cm. The graphene composite material contacts a heat source at 75° C. for 10 minutes to attain thermal equilibrium, and the surface of the graphene sheets is detected by the infrared thermometer. The resultant temperature is 71° C. lower than the original heat source by 4° C.

Experimental Example 9

The recipe includes 88% of polyurethane, 10% of aluminum oxide and 2% of the previous nano-scaled graphene sheets. The raw materials are pre-mixed according the recipe and Butanone is then added and strongly stirred. The PET substrate is coated by the mixture and the liquid evaporates at room temperature to form the graphene composite material, which has a thickness of 120-160 μm and a volume resistivity of $4.3*10^2$ ohm*cm. The graphene composite material contacts a heat source at 75° C. for 10 minutes to attain thermal equilibrium, and the surface of the graphene sheets is detected by the infrared thermometer. The resultant temperature is 68° C. lower than the original heat source by 7° C.

From the above mentioned, one key feature of the present invention is that the surface-modified nano-scaled graphene sheets and electrically conductive carbon black are uniformly dispersed in the matrix resin, and the nano-scaled graphene sheets are in contact with each other through carbon black so as to greatly strengthen the junction cohesion and improve the properties like mechanical performance, anti-oxidation, acid/alkali-resistance, electrical conductivity and thermal conductivity.

Although the present invention has been described with reference to the preferred embodiments, it will be well understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A graphene polymer composite material, comprising:
   a plurality of nano-scaled graphene sheets being 0.01-20 wt % (weight percent) of the graphene polymer composite material;
   a matrix resin being 40-99 wt % of the graphene polymer composite material; and
   a filler being 1-40 wt % of the graphene polymer composite material,
   wherein the nano-scaled graphene sheets are dispersed in the matrix resin, the filler is in contact with the plurality of nano-scaled graphene sheets so as to construct an electrically conductive network structure,
   wherein a thickness of the plurality of nano-scaled graphene sheets is 10-100 nm, a lateral size of the plurality of nano-scaled graphene sheets is 1-100 μm, and a ratio of a particle size of the filler to the thickness of the graphene sheet is 2-1000, and
   wherein the plurality of nano-scaled graphene sheets has at least one surface-modified layer formed by covering at least one surface modifying agent, the surface modifying agent is selected from a coupler having a chemical formula specified by $M_x(R)_y(R')_z$, M is a metal element, R is a hydrophilic functional group, R' is a hydrophobic functional group, $0 \le x \le 6$, $1 \le y \le 10$, $1 \le z \le 20$, the plurality of nano-scaled graphene sheets further has an oxygen content of 3-20 wt %, and the hydrophilic and hydrophobic functional groups form chemical bonds with the matrix resin and the filler.

2. The graphene polymer composite material as claimed in claim 1, wherein the surface modifying agent is specified by a chemical formula Rx-R'y, R' is selected from a group consisting of at least one of benzyl group, pyridine or triazine, R is selected from a group consisting of at least one of amino, alkoxy, carbonyl, carboxyl, acyloxy, acylamino, alkyleneoxy, dimethylamino and alkyleneoxy-carboxyl groups, $1 \le x \le 4$, and $0 \le y \le 10$.

3. The graphene polymer composite material as claimed in claim 1, wherein the matrix resin comprises at least one of thermoplastic resin, thermoset resin and elastomer.

4. The graphene polymer composite material as claimed in claim 1, wherein the matrix resin comprises at least one of polyolefine, polyester, polycarbonate, polyurethane, polyamide, poly(methyl methacrylate), polyacetal, fluorocarbon resin, polyphenylene oxide, polyacrylonitrile-styrene and polyacrylonitrile-butadiene-styrene.

5. The graphene polymer composite material as claimed in claim 1, wherein the matrix resin comprises at least one of epoxy resin, melamine resin, polyethylene terephthalate resin, urea resin and phenolic resin.

6. The graphene polymer composite material as claimed in claim 1, wherein the matrix resin comprises at least one of styrenic elastomer, olefinic elastomer, urethane elastomer, ester elastomer and arnide elastomer.

7. The graphene polymer composite material as claimed in claim 1, wherein the filler is selected from a group consisting of at least one of metal particle, ceramic particle and carbon black, the metal particle is selected from a group consisting of at least one of gold, silver, copper, nickel, titanium and aluminum, and the ceramic particle is selected from a group consisting of at least one of aluminum nitride, boron nitride, silicon carbide, aluminum oxide, silicon oxide, aluminum hydroxide and magnesium hydroxide.

8. The graphene polymer composite material as claimed in claim 1, further comprising a wetting dispersant, wherein the wetting dispersant comprises at least one of stearamide, polyamide wax, white mineral oil, polypropylene wax, polyethylene wax, vinyl acetate wax, paraffin wax, poly(1,6-hexamethylene adipate), calcium stearate, zinc stearate, poly(methyl methacrylate), polyacrylic acid, polyethylenimine, polyacrylamide ethyl-trimethyl-ammonium chloride, polyvinylpyrrolidone (PVP), stearic acid and 3-(trimethoxysilyl) propyl methacrylate.

9. The graphene polymer composite material as claimed in claim 1, wherein the nano-scaled graphene sheet comprises N stacked graphene layers, N is 30-300, and a tap density of the nano-scaled graphene sheet is 0.1-0.01 g/cm³.

10. The graphene polymer composite material as claimed in claim 1, further having a volume resistivity less than $10^5$ ohm*cm and a thermal conductivity larger than 3 W/mK.

* * * * *